United States Patent
Agarwal et al.

(10) Patent No.: US 12,047,358 B2
(45) Date of Patent: Jul. 23, 2024

(54) DATABASE SYNCHRONIZATION SYSTEM IN NETWORKED ZONES USING BLOCKCHAIN

(71) Applicant: PayPal, Inc., San Jose, CA (US)

(72) Inventors: Anchika Agarwal, Singapore (SG); Pushpinder Singh, Sirsa (IN)

(73) Assignee: PAYPAL, INC., San Jose, CA (US)

( * ) Notice: Subject to any disclaimer, the term of this patent is extended or adjusted under 35 U.S.C. 154(b) by 178 days.

(21) Appl. No.: 17/732,493

(22) Filed: Apr. 28, 2022

(65) Prior Publication Data
US 2022/0255907 A1   Aug. 11, 2022

Related U.S. Application Data

(63) Continuation of application No. 16/908,259, filed on Jun. 22, 2020, now Pat. No. 11,356,424.

(51) Int. Cl.
| | |
|---|---|
| *H04L 9/40* | (2022.01) |
| *G06F 16/23* | (2019.01) |
| *G06F 16/27* | (2019.01) |
| *H04L 9/06* | (2006.01) |
| *H04L 9/00* | (2022.01) |

(52) U.S. Cl.
CPC ...... *H04L 63/0428* (2013.01); *G06F 16/2379* (2019.01); *G06F 16/27* (2019.01); *H04L 9/0643* (2013.01); *H04L 9/50* (2022.05)

(58) Field of Classification Search
CPC ..... H04L 9/50; H04L 9/0643; H04L 63/0428; G06F 16/27; G06F 16/2379
See application file for complete search history.

(56) References Cited

U.S. PATENT DOCUMENTS

| | | | |
|---|---|---|---|
| 10,331,695 B1 | 6/2019 | Stickle | |
| 10,643,155 B1 * | 5/2020 | Gurin | H04W 4/021 |
| 10,735,183 B1 * | 8/2020 | Mehta | H04L 63/045 |
| 10,855,749 B2 * | 12/2020 | Thurimella | H04L 63/126 |
| 10,938,791 B1 * | 3/2021 | Munson | H04L 67/104 |
| 10,943,680 B1 * | 3/2021 | Knas | H04L 9/0861 |
| 11,017,883 B1 | 5/2021 | Escala | |

(Continued)

OTHER PUBLICATIONS

NPL Search Terms (Year: 2024).*

(Continued)

*Primary Examiner* — Syed A Zaidi
(74) *Attorney, Agent, or Firm* — Haynes and Boone, LLP

(57) ABSTRACT

There are provided systems and methods for a database synchronization system in networked zones using blockchain. An electronic service provider may maintain data stores across different zones that may need to synchronize data across these zones. As such, the subject technology provides for data storage using interplanetary file system (IPFS) technology according to some embodiments with blockchain technology to create a secure and reliable data synchronization system. IPFS may be implemented as a data storage layer and blockchain as a transaction management system, where the IPFS address of data files and synchronization points are stored in a distributed ledger. Integration of the IPFS network with a fabric network can enhance IPFS with the fabric network to create a more secure file sharing platform to improve the transfer of data and database synchronization between different zones.

20 Claims, 5 Drawing Sheets

(56) References Cited

U.S. PATENT DOCUMENTS

| | | |
|---|---|---|
| 2005/0190694 A1 | 9/2005 | Ben-Nun et al. |
| 2011/0099602 A1 | 4/2011 | Apparao et al. |
| 2015/0326582 A1 | 11/2015 | Al-Khowaiter et al. |
| 2016/0156671 A1 | 6/2016 | Cabrera et al. |
| 2018/0101842 A1* | 4/2018 | Ventura ............... G06Q 10/087 |
| 2019/0156336 A1 | 5/2019 | Kasthuri |
| 2019/0327239 A1* | 10/2019 | Ferguson ............. H04L 9/0819 |
| 2020/0092097 A1* | 3/2020 | Chiu .................. G06Q 20/3678 |
| 2021/0035669 A1* | 2/2021 | Culver ............... G06F 21/6245 |
| 2021/0103581 A1 | 4/2021 | Lee et al. |
| 2021/0273785 A1* | 9/2021 | Higashikado ......... H04L 9/0819 |

OTHER PUBLICATIONS

International Search Report and Written Opinion for International Application No. PCT/US2021/037847 mailed on Sep. 21, 2021, 11 pages.

Wang J., et al., "Monoxide: Scale Out Blockchain with Asynchronous Consensus Zones," 16th (USENIX) Symposium on Networked Systems Design and Implementation (NSDI 19), May 2019, Retrieved from Internet URL: https://www.researchgate.net/publication/332950320_Monoxide_Scale_Out_Blockchain_with_Asynchronous_Consensus_Zones, Retrieved on Aug. 16, 2021, 20 pages.

International Preliminary Report on Patentability for Application No. PCT/US2021/037847, mailed on Jan. 5, 2023, 10 pages.

Maximilian Ernst Tschuchnig et al. "Immutable and Democratic Data in Permissionless Peer-to-Peer Systems", 2019 Sixth International Conference on Software Defined Systems (SDS), IEEE, Jun. 10, 2019 (Jun. 10, 2019), pp. 294-299, XP033579992, DOI: 10.1109/SDS.2019.8768645 [retrieved on Jul. 22, 2019].

Muhammad Muzammal et al: "Renovating blockchain with distributed databases: An open source system", Future Generation Computer Systems, vol. 90, Jul. 31, 2018 (Jul. 31, 2018), pp. 105-117, XP055632882, NL ISSN: 0167-739X, DOI: 10.1016/j.future.2018.07.042.

* cited by examiner

_US 12,047,358 B2_

DATABASE SYNCHRONIZATION SYSTEM IN NETWORKED ZONES USING BLOCKCHAIN

CROSS REFERENCE TO RELATED APPLICATIONS

The present application is a continuation application of U.S. patent application Ser. No. 16/908,259, filed Jun. 22, 2020, and is incorporated in reference in its entirety.

TECHNICAL FIELD

The present application generally relates to enterprise storage systems and more particularly to a database synchronization system in high security zones using blockchain.

BACKGROUND

Electronic payment providers may provide electronic transaction processing services to users, which may be used to send and receive funds with other entities. Some of these electronic payment providers may have multiple zones divided by networks. These individual zones may have their own data stores that may need synchronization across different zones.

Figure 1:
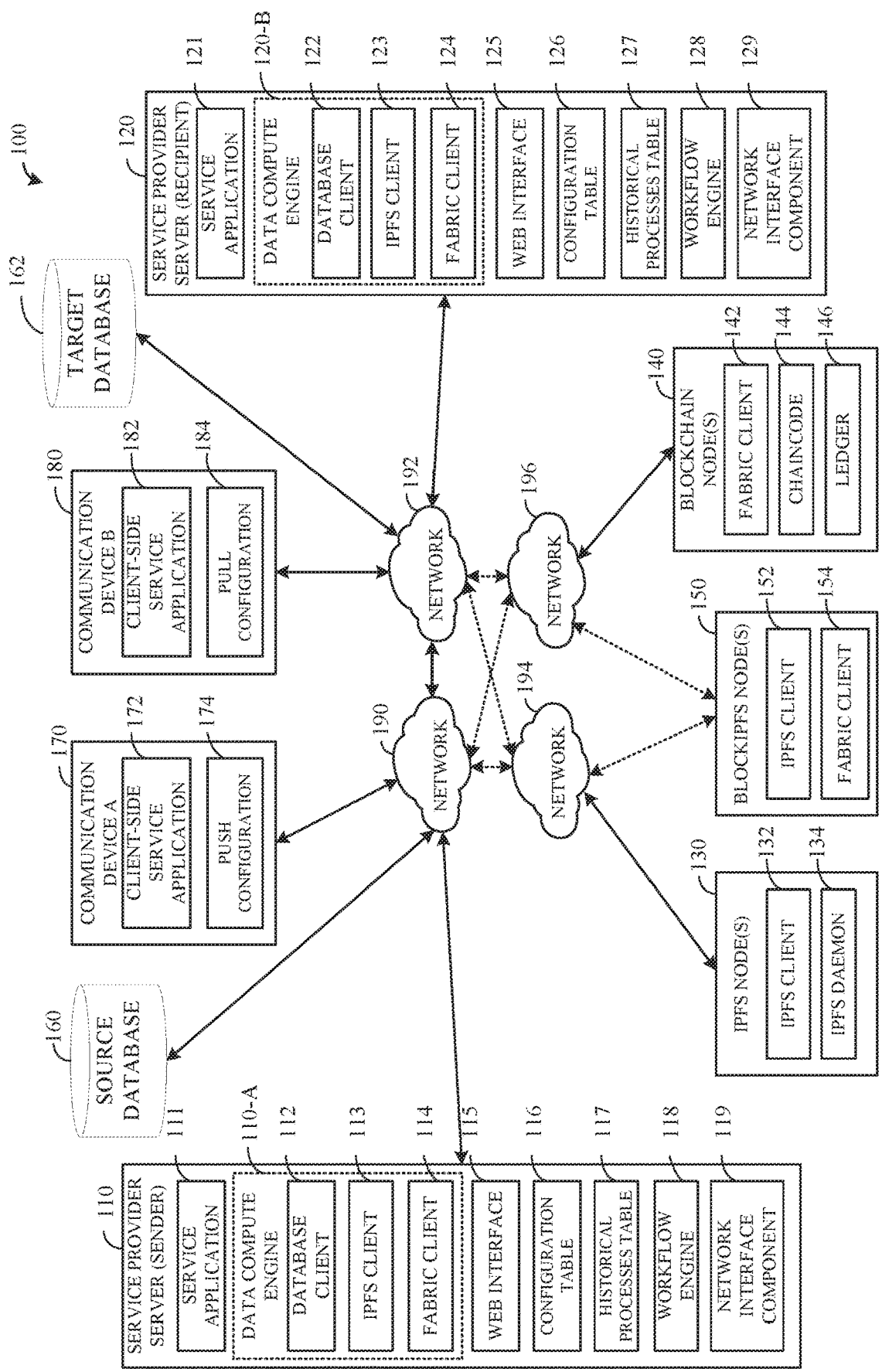
FIG. 1 illustrates a simplified block diagram of a networked multi-zone storage system suitable for implementing the processes described herein, according to an implementation.

Implementations of the present disclosure and their advantages are best understood by referring to the detailed description that follows. It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Technological advances have been made in the fields of computer technology and telecommunications, where commercial entities and end users can now engage in electronic activities more than ever. For example, advances have been made in a peer-to-peer (P2P) hyper media protocol designed to make the Internet faster, safer, and more open. Also, advances have been made in blockchain technology such as a hyper-ledger fabric network to improve the security of electronic transactions.

A blockchain system may include blocks linked together using cryptography. Each block may individually include a subset of records. Compared to conventional secured storage systems, blockchain systems are more resistant to the modification of the data stored in the blocks. The blockchain system is a decentralized data management platform that is not susceptible to change or variation. There are generally two categories of blockchains: permissionless and permissioned. A permissionless blockchain network (e.g., Ethereum, Bitcoin) is open to the public, and every transaction is to be validated by every or a majority of participants. A permissioned blockchain network is a private network, where authenticated users can join the permissioned blockchain. For example, a hyper-ledger fabric network is a permissioned blockchain technology. The hyper-ledger fabric network is a private blockchain technology in that authenticated users of the hyper-ledger fabric network are known to each other, and the authenticated users are permissioned to join. In some aspects, validation in this type of blockchain network is performed by a set of authenticated nodes. Thus, permissioned blockchain networks usually achieve higher performance than permissionless blockchain networks.

In a P2P network, such as Interplanetary File System (IPFS), if one node is down, other nodes in the IPFS network can serve needed files. IPFS can be used to share files on a private network or on the Internet through an IPFS gateway. IPFS enables users to use IPFS to share large files since IPFS uses local hosting, which reduces the need for bandwidth that is typically associated with sharing large files on a network. When a file is uploaded to IPFS, all peers with the hash address can access the content and download and view content locally.

Provided are methods utilized for a database synchronization system in high security zones using blockchain. Systems suitable for practicing methods of the present disclosure are also provided. A service provider, such as an electronic payment provider, may maintain data stores across different zones that may need to synchronize data across these zones. As such, the subject technology provides for data storage using IPFS technology in compliment with blockchain technology to create a more secure, scalable and reliable data synchronization system. The IPFS may be implemented as a data storage layer and the blockchain may be implemented as a transaction management system, where the IPFS address of data files and synchronization points are stored in a distributed ledger. In various aspects, the integration of the IPFS network with the hyper-ledger fabric network can be referred to as "BlockIPFS." BlockIPFS can enhance IPFS with the hyper-ledger fabric network to create a more secure file sharing platform to improve the transfer of data and database synchronization between different zones.

The subject technology provides several benefits in enterprise storage systems such as the nodes can become individual servers that can serve content to others in the IPFS network, which significantly reduces the need for additional bandwidth over the network. The IPFS network can compartmentalize the data and store the related data items using content addressing to be able to send large amounts of data over the network without requiring significant increases in network bandwidth. The hyper-ledger fabric network may not incur high storage or network overhead since the amount of metadata stored in the hyper-ledger fabric network is significantly smaller than the raw data stored in the IPFS network. For efficient searching, the ledger data maintained in the hyper-ledger fabric network can be indexed. The subject technology provides added security using the hyper-ledger fabric network, which has a trusted set of nodes that can access and alter data. The subject technology is also scalable to synchronize an increasing number of datastores and synchronize different types of datastores.

In some implementations of the subject technology, a service provider server, such as an electronic transaction server, may receive, at a first data compute engine in a first zone, a request to transfer a data item from a source database in the first zone to a target database in a second zone different from the first zone through an encrypted communication channel associated with a distributed ledger network. In some aspects, the service provider server may host the source database and the target database in different zones. In some examples, the distributed ledger network may refer to the hyper-ledger fabric network with blockchain technology. The first data compute engine may acquire, using a database client, in response to the request, the data item from the source database through a database connection to the source database. The first data compute engine may generate, using a peer-to-peer storage client, a hash address from content of the data item through a hash algorithm. The first data compute engine may store, using the peer-to-peer storage client, the data item in a data structure of at least one of a plurality of first node devices associated with a peer-to-peer distributed file storage network in the first zone. In some examples, the peer-to-peer distributed file storage network may refer to the IPFS network. The first data compute engine, may store, using a distributed ledger client, the hash address and configuration information associated with the data item into a ledger on at least one of a plurality of second node devices associated with the distributed ledger network in the first zone. The first data compute engine may send, using the distributed ledger client, a query to update a ledger on each of the plurality of second node devices with state information indicating a push transaction that corresponds to the storing of the data item in the peer-to-peer distributed file storage network for synchronizing the target database with the source database based on the push transaction and a pull transaction of the data item. In various aspects, the pull transaction is initiated and acted upon by a second data compute engine in the second zone.

FIG. 1 illustrates a simplified block diagram of a networked multi-zone storage system 100 suitable for implementing the processes described herein, according to an implementation. The networked multi-zone storage system 100 includes a service provider server 110, an IPFS node 130, a blockchain node 140, a blockIPFS node 150, a source database 160 and a communication device 170 communicatively coupled with each other over a network 190. The networked multi-zone storage system 100 also includes a service provider server 120, a target database 162 and a communication device 180, communicably coupled with each other over a network 192. The networked multi-zone storage system 100 also includes the IPFS node 130, the blockchain node 140, and the blockIPFS node 150, communicably coupled to the service provider server 120 via the network 192.

In some implementations, the networked multi-zone storage system 100 also includes a network 194 and a network 196. In some examples, the network 194 can refer to the IPFS network and the network 196 can refer to the hyper-ledger fabric network. In this respect, the IPFS node 130 may be communicably coupled to the network 190 and the network 192 via the network 194. Similarly, the blockchain node 140 may be communicably coupled to the network 190 and the network 192 via the network 196. The blockIPFS node 150 may be communicably coupled to the network 190 and the network 192 via either one of the network 194 or the network 196 because the blockIPFS node 150 has clients that support access to the IPFS network (e.g., 194) and the hyper-ledger fabric network (e.g., 196). As discussed above, the network 194 may be a decentralized file system network that operates with faster and more efficient data storage capabilities compared to conventional storage systems. The network 194 may allow computing nodes, such as the IPFS nodes 130 and/or the blockIPFS nodes 150, to share files and information across the network 194. The network 194 can manage the storage of large files that may consume or require large bandwidth to upload and/or download over the network 194. In some aspects, the network 194 can operate on top of different protocols, such as file transfer protocol (FTP) and hypertext transfer protocol (HTTP).

Each of the networks 190 and 192, in one implementation, may be implemented as a single network or a combination of multiple networks. For example, in various implementations, each of the networks 190 and 192 may include the Internet and/or one or more intranets, landline networks, wireless networks, and/or other appropriate types of communication networks. In another example, each of the networks 190 and 192 may include a wireless telecommunications network (e.g., cellular phone network) adapted to communicate with other communication networks, such as the Internet. In some examples, the network 190 may refer to a first trusted zone and the network 192 may refer to a second trusted zone. In some aspects, the first trusted zone may correspond to a first geographical region and the second trusted zone may correspond to a second geographical region (different from the first geographical region). In other aspects, the first trusted zone may correspond to a first network barrier and the second trusted zone may correspond to a second network barrier (different from the first network barrier). In still other aspects, the first trusted zone may correspond to a network having a first level of access and the second trusted zone may correspond to a network having a second level of access (different from the first level of access).

The service provider server 110, in one implementation, may be maintained by a transaction processing entity or an electronic service provider, which may provide electronic services (e.g., selling of merchandise processing, purchasing of merchandise, performing electronic transactions, authenticating transactions, etc.). As such, the service provider server 110 may include a service application 111, which may be adapted to interact with the communication device 170 over the network 190 to facilitate the searching, selection, purchase, payment of items, and/or other services offered by the service provider server 110. In one example, the service provider server 110 may be provided by PayPal®, Inc. of San Jose, California, USA, and/or one or more financial institutions or a respective intermediary that may provide multiple point of sale devices at various locations to facilitate transaction routings between merchants and, for example, financial institutions. In various implementations, the service provider server 110 also includes a data compute engine 110-A, a web interface 115, a configuration repository or table 116, a historical processes repository or table 117, and a workflow engine 118. The data compute engine 110-A includes a database client 112, an IPFS client 113, and a fabric client 114.

In some implementations, the service application 111 is adapted to process purchases and/or payments for financial transactions between a user and a merchant. In one implementation, the service application 111 assists with resolving financial transactions through validation, delivery, and settlement. As such, the service application 111 settles indebtedness between a user and a merchant, in which accounts may be directly and/or automatically debited and/or credited of monetary funds in a manner as accepted by the banking industry.

The database client 112 is adapted to interact with the source database 160 using a database communication protocol over a dedicated communication channel to the source database 160. The database client 112 may perform different data storage operations with the source database 160, such as a read operation, a write operation and/or an erase operation. As used herein, the read operation may be referred to as a "pull operation" and the write operation may be referred to as a "push operation."

The IPFS client 113 is adapted to interact with the IPFS node 130 and/or the blockIPFS node 150 using an IPFS specific communication protocol via the network 194. The IPFS client 113 may perform different data storage operations according to the IPFS specific communication protocol with the IPFS node 130 and/or the blockIPFS node 150, such as a read operation or a write operation. In some aspects, the IPFS client 113 includes a hash algorithm module (not shown) to perform a hash operation on a data item to generate a content-based hash address for IPFS storage location indexing. In this respect, the IPFS client 113 may provide the content-based hash address to the IPFS node 130 along with the data item for storage.

The fabric client 114 is adapted to interact with the blockchain node 140 and/or the blockIPFS node 150 using a hyper-ledger fabric specific communication protocol via the network 196. The fabric client 114 may perform different ledger operations according to the hyper-ledger fabric specific communication protocol, such as a read operation (e.g., to obtain metadata stored in a ledger) or a write operation (e.g., to store metadata into a ledger). In the hyper-ledger fabric network (e.g., 196), each of the blockchain nodes 140 and the blockIPFS nodes 150 may be responsible for managing metadata relating to data items stored in the IPFS network (e.g., 194) and a blockchain ledger (e.g., the ledger may store transactions-related metadata).

The web interface 115 may include a client-side interface to allow the communication device 170 to interact with the service provider server 110. For example, the web interface 115 may include a software program, such as a graphical user interface (GUI), executable by a processor of the service provider server 110 that is adapted to interface to a user associated with the communication device 170. The web interface 115 may include a browser application that supports a data connection between the service provider server 110 and the communication device 170. The web interface 115 may be adapted to receive user input, such as a request to initiate a push operation to synchronize the source database 160 with the target database 162 between the network 190 and the network 192. For example, the user input may include a channel configuration indicating usage of a same channel between data source and data destination or usage of different channels between the data source and the data destination. In some aspects, a channel is formed based on presence of a source database and/or a target database. In some implementations, each source database with a data connection to a unique target database can operate on a different channel.

The configuration repository 116 may be a repository that is adapted to store configuration information entered through the web interface 115. The configuration information may include a database identifier (e.g., identifying the source database 160), a table identifier (e.g., identifying a data structure containing one or more data items), a user identifier column identifier (e.g., identifying a designated region in the data structure that contains a listing of entities storing data items to the network), a schedule frequency, and a channel identifier (e.g., identifying a channel between the source database 160 and the target database 162).

The historical processes repository 117 may be a repository that is adapted to store a listing of processes identifying push transactions performed in the network 190 of the networked multi-zone storage system 100. For example, each new push transaction to synchronize and/or transfer data from the source database 160 to the target database 162 is stored (or recorded thereon) in the historical processes repository 117.

The workflow engine 118 may include a software program executable by the processor of the service provider server 110 that is adapted to initiate a process based on the availability of the data compute engine 110-A. The workflow engine 118 may be implemented as a process management system that coordinates the running (or execution) of all processes. In some aspects, the workflow engine 118 acquires details from the configuration information stored in the configuration repository 116. For example, the workflow engine 118 may obtain details from the configuration information and spawn (or invoke) a client process on the data compute engine 110-A. In various aspects, the workflow engine 118 manages a channel formed between the source database 160 and the target database 162. In some aspects, the workflow engine 118 creates a channel based on the configuration information if the channel is not present (or not already created). In some implementations, the channel may include a dedicated encrypted channel to provide secured data communications between the source database 160 and the target database 162.

In various implementations, service provider server 110 includes at least one network interface component 119 adapted to communicate with IPFS nodes 130, blockchain nodes 140, blockIPFS nodes 150 and/or other entities over the network 190. In various implementations, network interface component 119 may include a modem, an Ethernet device, a broadband device, a satellite device and/or various other types of wired and/or wireless network communication devices including microwave, radio frequency (RF), and infrared (IR) communication devices.

The IPFS node 130 includes an IPFS client 132 and an IPFS daemon 134. The IPFS client 132 is adapted to interact with the IPFS client 113 of the data compute engine 110A in the service provider server 110 using an IPFS specific communication protocol via the network 194 (e.g., IPFS network) and the network 190 (e.g., the first trusted zone). The IPFS daemon 134 may be a background process that facilitates the operations executed by the IPFS client 132. In some aspects, the IPFS daemon The IPFS client 132 may perform different local data storage operations, such as storing the raw content of the data item in a local memory of the IPFS node 130. In some aspects, the IPFS client 132 includes a hash algorithm module (not shown) to perform a hash operation on a data item to generate a content-based hash address for IPFS storage location indexing. On IPFS, data items are content addressed rather than location addressed. When a data item is added to the network, the IPFS client 132 can create a multi-hash address of the data item based on its content and a node identifier (ID) ensuring that no two data items share the same multi-hash address. The node ID may be a cryptographic hash of the node's public key (e.g., the IPFS node 130, blockIPFS node 150). To allow other nodes (e.g., the IPFS node 130, blockIPFS node 150) to access the data item, the multi-hash address can be stored in a ledger maintained by the nodes of the hyper-ledger fabric network (e.g., the blockchain nodes 140, blockIPFS nodes 150). In some aspects, the IPFS node 130, using the IPFS client 132, (or blockIPFS node 150 using the IPFS client 152) may search for data items through a content identifier (CID) instead of searching by the location of the data item. For example, any IPFS client 132 with the hash address of the content (obtained from the ledger stored in the hyper-ledger fabric network) can search for the specific data item on the network 194 and any IPFS client 132 that has a matching data item can serve it. As a result, a data item on the network 194 can be served so long as there is an IPFS node that can serve it. The network 194 can eliminate content duplication by ensuring that data items with the same content that are uploaded by a specific IPFS node are stored only once. Although FIG. 1 illustrates one instance of the IPFS node 130, there may be multiple instances of the IPFS node 130 to form a network of IPFS nodes within the network 194.

The blockchain node 140 includes a fabric client 142, a chaincode 144, and a ledger 146. The fabric client 142 is adapted to interact with the fabric client 114 of the data compute engine 110-A in the service provider server 110 using the hyper-ledger fabric specific communication protocol via the network 196 and the network 190. The fabric client 142 may perform different ledger operations according to the hyper-ledger fabric specific communication protocol, such as a read operation (e.g., to obtain metadata stored in the ledger 146) or a write operation (e.g., to store transactions-related metadata into the ledger 146). In the network 196, the fabric client 142 may be responsible for managing metadata relating to data items stored in the network 194. The chaincode 144 may be a software program and/or logic that implements a prescribed interface for initializing and managing ledger states through transactions submitted by the fabric client 114 at the data compute engine 110-A. For example, the chaincode 144 may record a ledger state indicating a push state, where a data item stored in the network 194 is intended to be pushed to the target database 162 via the network 192. In some aspects, the chaincode 144 may be referred to as a "smart contract." The ledger 146 may be a data structure that is decentralized and distributed across different nodes in the network 196. The ledger 146 can have a full historical and trusted records of the data items stored in the network 194, such as which entity created the data item and when, which entity accessed the data item and how, which entity (or entities) can access what file. Raw data is stored in the storage managed by the IPFS node 130 and/or the blockIPFS node 150, but not the blockchain nodes 140. The blockchain also provides an added means of sharing a multi-hash address based on the content of a data item. Once a data item is added to network 194 and the multi-hash address is added to the ledger 146, all members of the network 196 can have access to the hash address. In various aspects, IPFS operations and their related metadata storage in the hyper-ledger fabric network via the network 196 are synchronized however, to ensure continuity. Although FIG. 1 illustrates one instance of the blockchain node 140, there may be multiple instances of the blockchain node 140 to form a network of blockchain nodes within the network 196.

The blockIPFS node 150 includes an IPFS client 152 and a fabric client 154. In some implementations, the IPFS client 152 may be similar to the IPFS client 132, and the fabric client 154 may be similar to the fabric client 142. Although FIG. 1 illustrates one instance of the blockIPFS node 150, there may be multiple instances of the blockIPFS node 150 to form a network of blockIPFS nodes that coexist within the network 194 and the network 196.

As depicted in FIG. 1, the service provider server 120 also includes a service application 121, a database client 122, an IPFS client 123, a fabric client 124, a web interface 125, a configuration repository 126, a historical processes repository 127, a workflow engine 128 and a network interface component 129. For brevity of explanation, the service provider server 120 includes components similar to that of the service provider server 120. For example, the service application 121 may be similar to the service application 111. The database client 122 may be similar to the database client 112. The IPFS client 123 may be similar to the IPFS client 113. The fabric client 124 may be similar to the fabric client 114. The web interface 125 may be similar to the web interface 115. The configuration table 126 may be similar to the configuration table 116. The historical processes repository 127 may be similar to the historical processes repository 117. The workflow engine 128 may be similar to the workflow engine 118. The network interface component 119 may be similar to the network interface component 129.

The communication device 170 (depicted as "communication device A"), in various implementations, may be implemented using any appropriate combination of hardware and/or software configured for wired and/or wireless communication over the network 190. The communication device 180 (depicted as "communication device B"), in various implementations, may be implemented using any appropriate combination of hardware and/or software configured for wired and/or wireless communication over the network 192. For example, in one embodiment, each of the communication devices 170 and 180 may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data.

The communication device 170 may install and execute a client-side service application 172 received from the transaction processing server 110 to facilitate one or more transaction processes (e.g., peer-to-peer payments). The client-side service application 172 may allow a user to send a transaction request to the service provider server 110, which includes communication of data or information needed to complete the request, such as funding source information.

The communication device 170 may include a push configuration module 174 that may be used, for example, to initiate a database synchronization mechanism. For example, a user associated with the communication device 170 may initiate a request to transfer data from the source database 160 to the target database 162 using the IPFS system with added security using the hyper-ledger fabric network. In other aspects, the request to initiate the data transfer may be invoked by an authentication operation as part of an electronic service transaction process.

The communication device 180 may install and execute a client-side service application 182 received from the transaction processing server 110 to facilitate one or more transaction processes (e.g., peer-to-peer payments). In some aspects, the client-side service application 182 may coordinate with the client-side service application 172 of the communication device 170 to facilitate a transaction between the source database 160 and the target database 170. The communication device 180 may include a pull configuration module 184 that may be used, for example, to complete a database synchronization mechanism. For example, a user associated with the communication device 180 may initiate a request to obtain data that is in transit from the source database 160 to the target database 162 using the IPFS system with the added security provided by the hyper-ledger fabric network. In some aspects, the pull configuration 184 may manage requests to pull data from an IPFS node (e.g., 130) to store at the target database 162.

Figure 2:
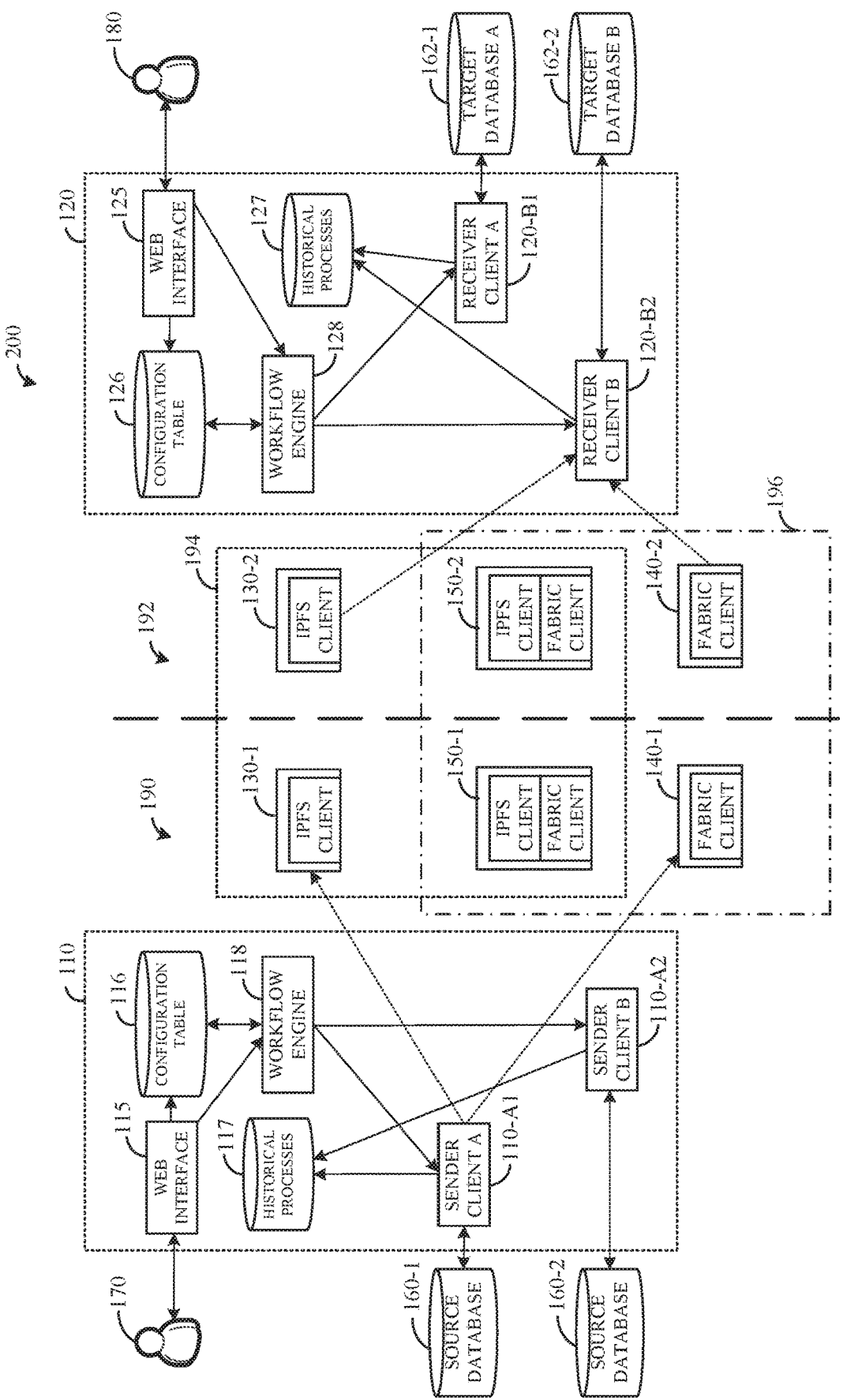
FIG. 2 illustrates a detailed block diagram of a networked multi-zone storage system suitable for implementing the processes described herein, according to an implementation.

FIG. 2 illustrates a detailed block diagram of a networked multi-zone storage system 200 suitable for implementing the processes described herein, according to an implementation. For brevity of explanation, the networked multi-zone storage system 200 may be similar to the networked multi-zone storage system of FIG. 1 such that components in the networked multi-zone storage system 200 correspond to those in the networked multi-zone storage system of FIG. 1. As such, the discussion of FIG. 2 will be made in reference to the components described in the networked multi-zone storage system of FIG. 1.

As depicted in FIG. 2, the networked multi-zone storage system 200 includes the service provider server 110 and the service provider server 120 communicably coupled to the network 194 (e.g., IPFS network) and to the network 196 (e.g., hyper-ledger fabric network). The networked multi-zone storage system 200 can facilitate the database synchronization between trusted (or high security) zones using blockchain and IPFS storage systems. For example, the service provider server 110 may serve as the sender of data from the source database (e.g., 160-1, 160-2) and the service provider server 120 may serve as the receiver of the transferred data for storage in the target database (e.g., 162-1, 162-2). The service provider server 110 may have multiple client devices, such as client 110-A1 (depicted as "Sender Client A") and client 110-A2 (depicted as "Sender Client B") for facilitating the push transaction of data with respective interfaces to the source database 160-1 and the source database 160-2. In various aspects, each of the clients 110-A1 and 110-A2 corresponds to the data compute engine 110-A. Similarly, the service provider server 120 may have multiple client devices, such as client 120-B1 (depicted as "Receiver Client A") and client 120-B2 (depicted as "Receiver Client B") for facilitating the pull transaction of data with respective interfaces to the target database 162-1 and the target database 162-2. In various aspects, each of the clients 120-B1 and 120-B2 corresponds to the data compute engine 120-B.

For explanatory purposes, the following description will be made in reference to a push transaction from the point of view of the network 190 as the first trusted zone (with the network 192 being the second trusted zone).

A user (e.g., a network administrator) associated with the communication device 170 may interact with the service provider server 110 via the web interface 115. In some aspects, the user may provide a configuration to the service provider server 110 to manage a push transaction traversing through the networks 190-196 to the target database 160. For example, a web application module, using the web interface 115 to the communication device 170, may receive a configuration file that includes configuration information (or metadata). In some aspects, the configuration information may include one or more of a database identifier (e.g., object namespace) identifying the target database 162, a table identifier (e.g., UID column name) identifying a location within the data structure of the target database 162, a unique identifier (e.g., UID value) indicating an epoch column that provides a synchronization point to the source database 160, and/or a channel identifier indicating the encrypted communication channel between the source database 160 and the target database 162. The web interface 115 may initiate a write operation with a first data repository that is communicably coupled to the web application module to store the configuration table 116 in a data structure of the first data repository. The web interface 115 also may interface to the workflow engine 118.

The workflow engine 118 may obtain the configuration file that includes the configuration information from the configuration table 116 in the data repository communicably coupled to the workflow engine 118. The workflow engine 118 may then determine whether a channel identifier is present in the configuration information. In some aspects, the channel identifier may indicate the presence of a dedicated communication channel between the source database 160 and the target database 162. In some aspects, the workflow engine establishes an encrypted communication channel when the channel identifier is not present in the configuration information. Otherwise, the workflow engine 118 may locate and utilize the existing communication channel for facilitating the database synchronization and/or data transfer between different trusted zones.

The workflow engine 118 may then initiate one or more client processes that correspond to respective data transfer processes for transferring data from the network 190 (e.g., a first trusted zone) to the network 192 (e.g., a second trusted zone). For example, the workflow engine 118 may spawn the client processes on each of the clients 110-A1 and 110-A2. In some aspects, the workflow engine 118 can access a second data repository communicably coupled to the workflow engine 118 and log each of the respective data transfer processes into the historical processes table 117 in the second data repository prior to starting the client processes. In some implementations, the workflow engine 118 can select either the client 110-A1 or the client 110-A2 based on available resources of the client 110-A1 and the client 110-A2. In some aspects, the client with the most available resources is selected by the workflow engine 118. In other aspects, the workflow engine 118 may select the client 110-A1 or the client 110-A2 based on other aspects in network resource allocation.

In some implementations, a first data compute engine in the first zone, such as the client 110-A1 in the network 190, can receive a request from the workflow engine 118 to transfer a data item from the source database 160-1 in the first zone to the target database 162-1 in the second zone through an encrypted communication channel associated with a distributed ledger network, such as the network 196. In this respect, the client 110-A1 may connect to the source database 160-1 via a dedicated database connection. In some implementations, a database client (e.g., 112) of the client 110-A1 can acquire, in response to the request, the data item from the source database 160-a through the dedicated database connection to the source database 160-1. In some aspects, the client 110-A1, using the database client, records a time at which the data item is acquired from the source database 150-1. In this respect, a synchronization point is generated to denote the time at which the data item was last refreshed (or updated) at the source database 150-1. In some aspects, the location within the source database 160-1 at which the data item is acquired may be acquired to update the configuration information such that the data item can be stored in a corresponding location at the target database 162-1 (e.g., via a table identifier). In some aspects, the data item is acquired at a location within the source database 160-1 that corresponds to the configuration information. In some implementations, the distributed ledger network includes a proprietary blockchain network that includes the plurality of second node devices (e.g., 140-1, 140-2, 150-1, 150-2), in which each of the plurality of second node devices is an authenticated node device (or permitted member of the network 196).

In some implementations, a distributed storage client (e.g., IPFS client 113) of the client 110-A1 can generate a hash address from content of the data item through a hash algorithm. In some implementations, the hash address includes an encoded representation of the content in the data item. In some implementations, the distributed storage client may use cryptographic hashing functions to create fingerprints. In some aspects, the distributed storage client can implement a SHA256 hashing algorithm that is tamperproof and ensures security and authenticity of files added to the network 194. In some examples, the content of the data items may be represented with a multi-hash format and base58 encoding. In some implementations, the distributed storage client acquires the raw content in the data item and runs that data through a hash function to produce a digest. This digest may be cryptographically unique to the contents of the data item. If an entity modified the data item by even one bit, the hash address may become completely different. In some aspects, the distributed file storage client may generate the hash address from content of the data item through the hash algorithm. In generating the hash address, the distributed file storage client may process the content in the data item through a first hash function of the hash algorithm to produce the digest that is unique to the content in the data item, and thereafter convert the digest into the hash address through a second hash function of the hash algorithm.

Once the hash address has been generated, an IPFS node can store the raw content of the data item within the IPFS network. In some implementations, the distributed storage client of the client 110-A1 can store the data item in a data structure of at least one of a plurality of first node devices associated with a distributed file storage network (e.g., the network 194) in the first zone. For example, client 110-A1, via the distributed storage client, can access one of the nodes associated with the network 194, such as the node 130-1 and/or the node 150-1 for performing a local storage operation at one of the IPFS nodes. In some aspects, the node 130-1 include an IPFS client (similar to the IPFS client 132) and the node 150-1 includes an IPFS client (similar to the IPFS client 152) and a fabric client (similar to the fabric client 154). In some aspects, the node 130-1 may be associated to the network 194 (e.g., IPFS network), whereas the node 150-1 may be associated to the network 194 and the network 196 (e.g., hyper-ledger fabric network).

Once the data item has been stored in the IPFS network, the hyper-ledger fabric network can store the hash address in a ledger to add security and tracing capabilities to the IPFS-stored data item. In some implementations, a distributed ledger client (e.g., fabric client 114) of the client 110-A1 can store the hash address and configuration information associated with the data item into a ledger on at least one of a plurality of second node devices associated with the distributed ledger network (e.g., the network 196) in the first zone. For example, client 110-A1, via the distributed ledger client, can access one of the nodes associated with the network 196, such as the node 140-1 and/or the node 150-1 for storage of the hash address in a ledger (e.g., the ledger 146) at one of the blockchain nodes. In some aspects, the node 140-1 include a fabric client (similar to the fabric client 142) and the node 150-1 includes a fabric client (similar to the fabric client 154). In some aspects, the node 140-1 may be associated to the network 196 (e.g., hyper-ledger fabric network), whereas the node 150-1 may be associated to the network 194 and the network 196.

In some implementations, the client 110-A1, using the distributed ledger client, can generate metadata of the data item. The metadata may include the hash address, the UID column name, UID value, and object namespace (or namespace identifier) of the target database 162. In some aspects, the metadata indicates a transactional history of the data item. In some implementations, the distributed ledger client may encode the metadata into an encoded metadata accessible by each authenticated node device of the plurality of second node devices (e.g., the nodes 140-1, 140-2, 150-1, 150-2). The distributed ledger client may initiate a storage operation to store the encoded metadata as ledger data into the ledger 146 on the at least one of the plurality of second node devices.

Once the hash address has been securely stored in the ledger of one of the blockchain nodes, the fabric client of the blockchain node may update the ledger state so that other blockchain nodes (e.g., authenticated members of the network 196) in both the first trusted zone (e.g., the network 190) and the second trusted zone (e.g., the network 192) are notified and/or provided with access. In some implementations, the distributed ledger client of the client 110-A1 can send a query to update a ledger on each of the plurality of second node devices (e.g., 140-1, 140-2, 150-1, 150-2) with state information indicating a first type of transaction (e.g., push transaction) that corresponds to the storing of the data item in the distributed file storage network (e.g., the network 196) for synchronizing the target database 160 with the source database 160 based on the first type of transaction and a second type of transaction (e.g., pull transaction) of the data item. In this respect, to complete the database synchronization, both a push transaction and a pull transaction are to be completed so that the target database 160 successfully receives the data item along with synchronization information to successfully synchronize its contents with the source database 160. In some aspects, the data item can be stored in the target database 162-1 according to the synchronization point and the table identifier included in the configuration information stored in the configuration table 116. As such, the push transaction may include an indication of which target database and at which location within the target database to store the data item.

In some implementations, the state information prompts a second data compute engine in the second zone (e.g., client 120-B1, client 120-B2) to acquire the data item from at least one of the plurality of first node devices associated with the distributed file storage network in the second zone (e.g., node 130-2, node 150-2) based on the hash address acquired from at least one of the plurality of second node devices associated with the distributed ledger network in the second zone (e.g., node 140-2, node 150-2) and to store the data item in a data structure of the target database 162. For example, an update to the ledger state information, such as indicating a push transaction has occurred within the network 196, prompts the updated state information to notify nodes in the network 192 (e.g., nodes in the second trusted zone) of the push transaction. In this respect, the client 120-B1, for example, may be invoked to facilitate a pull transaction that acquires the data item traversed through the push transaction. As such, the hash address can be obtained from one of the fabric clients (e.g., fabric client 140-2) and the IPFS node storing the data item (e.g., 130-1, 130-2) can be located using the hash address.

In some implementations, the generating the hash address comprises: portioning, by the first data compute engine with the distributed file storage client, the data item into a plurality of chunks of data in a predetermined block size based on the configuration information; processing, by the first data compute engine with the distributed file storage client, each of the plurality of chunks of data through a first hash function of the hash algorithm to produce a digest that is unique to content in the chunk of data; converting, by the first data compute engine with the distributed file storage client, the digest of each of the plurality of chunks of data into a respective content identifier of a plurality of content identifiers through a second hash function of the hash algorithm; and combining, by the first data compute engine with the distributed file storage client, the plurality of content identifiers into a hierarchical data structure to compute the hash address.

A user (e.g., a network administrator) associated with the communication device 180 may interact with the service provider server 120 via the web interface 125. In some aspects, the user may provide a configuration to the service provider server 120 to manage a pull transaction traversing through the networks 192-196 to the target database 160. For example, a web application module, using the web interface 125 to the communication device 180, may receive a configuration file that includes configuration information (or metadata). In some aspects, the configuration information may include one or more of a database identifier identifying the target database 162, a table identifier identifying a location within the data structure of the target database 162, a unique identifier indicating an epoch column that provides a synchronization point to the source database 160, channel scan frequency and/or a channel identifier indicating the encrypted communication channel between the source database 160 and the target database 162. In some implementations, the configuration file in the network 190 may be similar to the configuration file in the network 192 to facilitate coordinate in the database synchronization between the network 190 and the network 192. In some aspects, the web interface 125 may initiate a write operation with a first data repository that is communicably coupled to the web application module to store the configuration table 126 in a data structure of the first data repository. The web interface 125 also may interface to the workflow engine 128.

For explanatory purposes, the following description will be made in reference to a pull transaction from the point of view of the network 192 as the first trusted zone (with the network 190 now being the second trusted zone).

The workflow engine 128 may obtain the configuration file that includes the configuration information from the configuration table 126 in the data repository communicably coupled to the workflow engine 128. The workflow engine 128 may then initiate one or more client processes that correspond to respective data transfer processes for transferring data from the network 190 (e.g., a first trusted zone) to the network 192 (e.g., a second trusted zone). For example, the workflow engine 128 may spawn the client processes on each of the clients 120-B1 and 120-B2. In some aspects, the workflow engine 128 can access a second data repository communicably coupled to the workflow engine 128 and log each of the respective data transfer processes into the historical processes table 127 in the second data repository prior to starting the client processes. In some implementations, the workflow engine 128 can select either the client 120-B1 or the client 120-B2 based on available resources of the client 120-B1 and the client 120-B2.

In some implementations, a first data compute engine in a first zone, such as the client 120-B2 in the network 192, can receive state information indicating a first type of transaction (e.g., push transaction) of a data item sent through an encrypted communication channel associated with a distributed ledger network (e.g., the network 196) from a source database (e.g., the source database 160-1) in a second zone different from the first zone (e.g., the network 190) to a target database (e.g., the target database 162-1) in the first zone (e.g., the network 192).

In some implementations, a distributed ledger client (e.g., fabric client 124) of the client 120-B1 can determine that the first type of transaction (e.g., pull transaction) is accessible to the network 192 from at least one of a plurality of first node devices associated with the distributed ledger network (e.g., node 140-2, 150-2) in the first zone through the encrypted communication channel. For example, the client 120-B1, using the distributed ledger client can check the encrypted communication channel for the push transaction if the last ledger state indicates a push transaction has occurred.

In some implementations, the distributed ledger client of the client 120-B1 can acquire metadata of the data item from at least a portion of the first type of transaction (e.g., the push transaction metadata) that is stored in a ledger on the at least one of the plurality of first node devices. In some implementations, the distributed ledger client of the client 120-B1 can receive the metadata from the ledger through a chaincode hosted on the at least one of the plurality of first node devices. For example, the distributed ledger client of the client 120-B1 can access the ledger state information from the chaincode 144 of the at least one of a plurality of first node devices associated with the network 196. In some aspects, the distributed ledger client of the client 120-B1 can recover the hash address of the data item from the metadata. In recovering the hash address, the distributed ledger client may apply a decoding function.

Once the hash address is acquired, a distributed storage client (e.g., IPFS client 123) of the client 120-B1 can acquire the data item from at least one of a plurality of second node devices associated with a distributed file storage network in the second zone (e.g., node 130-2, 150-2) based on the hash address.

Once the data item is acquired by the IPFS client of the client 120-B2, the database client of the client 120-B2 is invoked. In some implementations, a database client (e.g., database client 123) of the client 120-B1 can store the data item in a data structure of the target database 162-1 based on the namespace identifier of the target database 162-1 from the metadata. In some aspects, the data item can be stored in one or more memory locations of the data structure in the target database 162-1 that follow the synchronization point of the source database 160-1. In this respect, the client 120-B1, using the database client, can identify a synchronization point in the data structure of the target database 162-1 that corresponds to at least a portion of the data structure in the source database 160-1 based on the metadata.

In some implementations, the distributed ledger client of the client 120-B1 can send a query to update a ledger on each of the plurality of first node devices with state information indicating a second type of transaction that corresponds to a retrieval of the data item from the distributed file storage network (e.g., the pull transaction) and the storing of the data item in the target database 162-1. In some aspects, the target database 162-1 is synchronized with the source database 160-1 based on the first type of transaction (e.g., the push transaction) and the second type of transaction (e.g., the pull transaction) of the data item.

Figure 3:
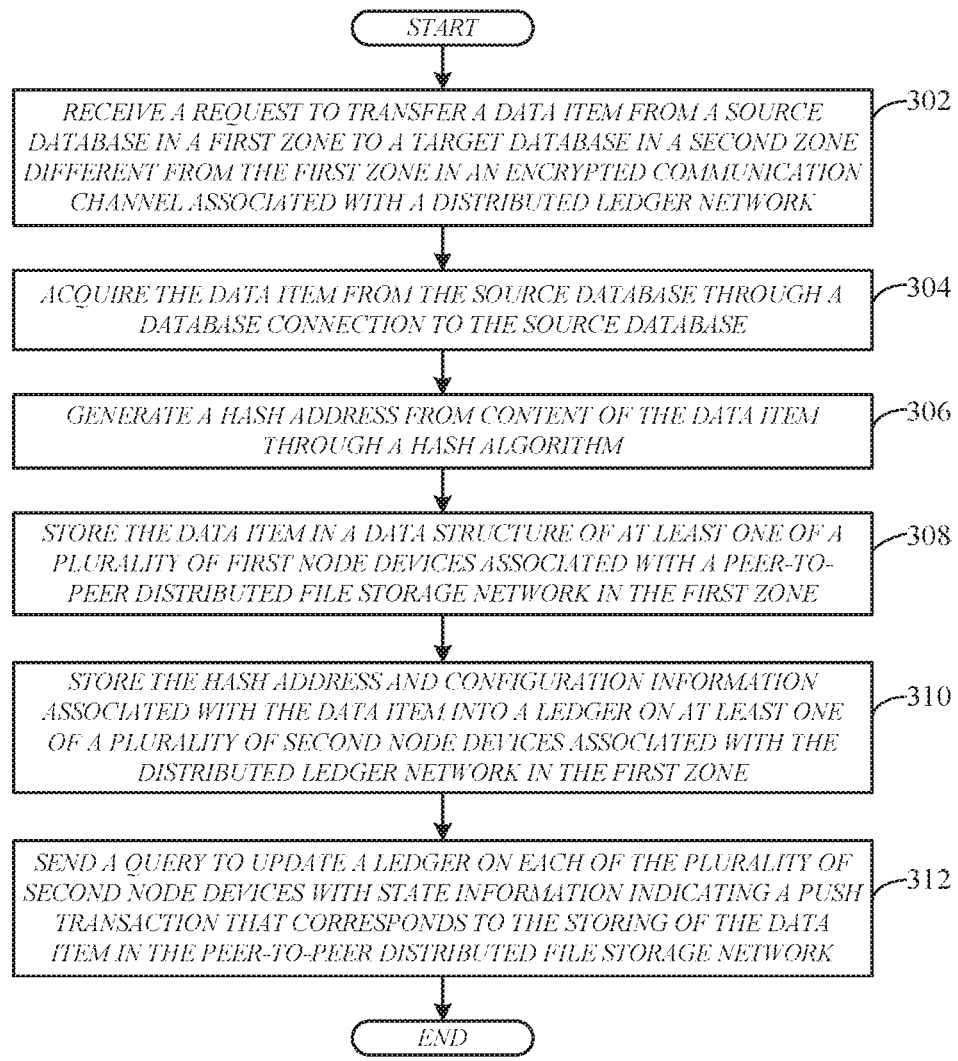
FIG. 3 illustrates a flowchart of a push transaction for transferring data between different zones, according to an implementation.

FIG. 3 illustrates a flowchart of a push transaction for transferring data between different zones, according to an implementation. One or more of the steps 302-308 of process 300 may be implemented, at least in part, in the form of executable code stored on non-transitory, tangible, machine-readable media that when run by one or more processors may cause the one or more processors to perform one or more of the steps 302-308. Some examples of computing devices, such as computing system 500 may include non-transitory, tangible, machine readable media that include executable code that when run by one or more processors (e.g., processor 512) may cause the one or more processors to perform the steps of process 300. As illustrated, the process 300 includes a number of enumerated steps, but aspects of the process 300 may include additional steps before, after, and in between the enumerated steps. In some aspects, one or more of the enumerated steps may be omitted or performed in a different order.

The process 300 starts at step 302, where a first data compute engine in a first zone can receive a request to transfer a data item from a source database in the first zone to a target database in a second zone different from the first zone through an encrypted communication channel associated with a distributed ledger network.

Next, at step 304, a database client of the first data compute engine can acquire, in response to the request, the data item from the source database through a database connection to the source database.

Subsequently, at step 306, a distributed storage client of the first data compute engine can generate a hash address from content of the data item through a hash algorithm.

Next, at step 308, the distributed storage client of the first data compute engine can store the data item in a data structure of at least one of a plurality of first node devices associated with a distributed file storage network in the first zone.

Subsequently, at step 310, a distributed ledger client of the first data compute engine can store the hash address and configuration information associated with the data item into a ledger on at least one of a plurality of second node devices associated with the distributed ledger network in the first zone.

Next, at step 312, the distributed ledger client of the first data compute engine can send a query to update a ledger on each of the plurality of second node devices with state information indicating a first type of transaction that corresponds to the storing of the data item in the distributed file storage network for synchronizing the target database with the source database based on the first type of transaction and a second type of transaction of the data item.

Figure 4:
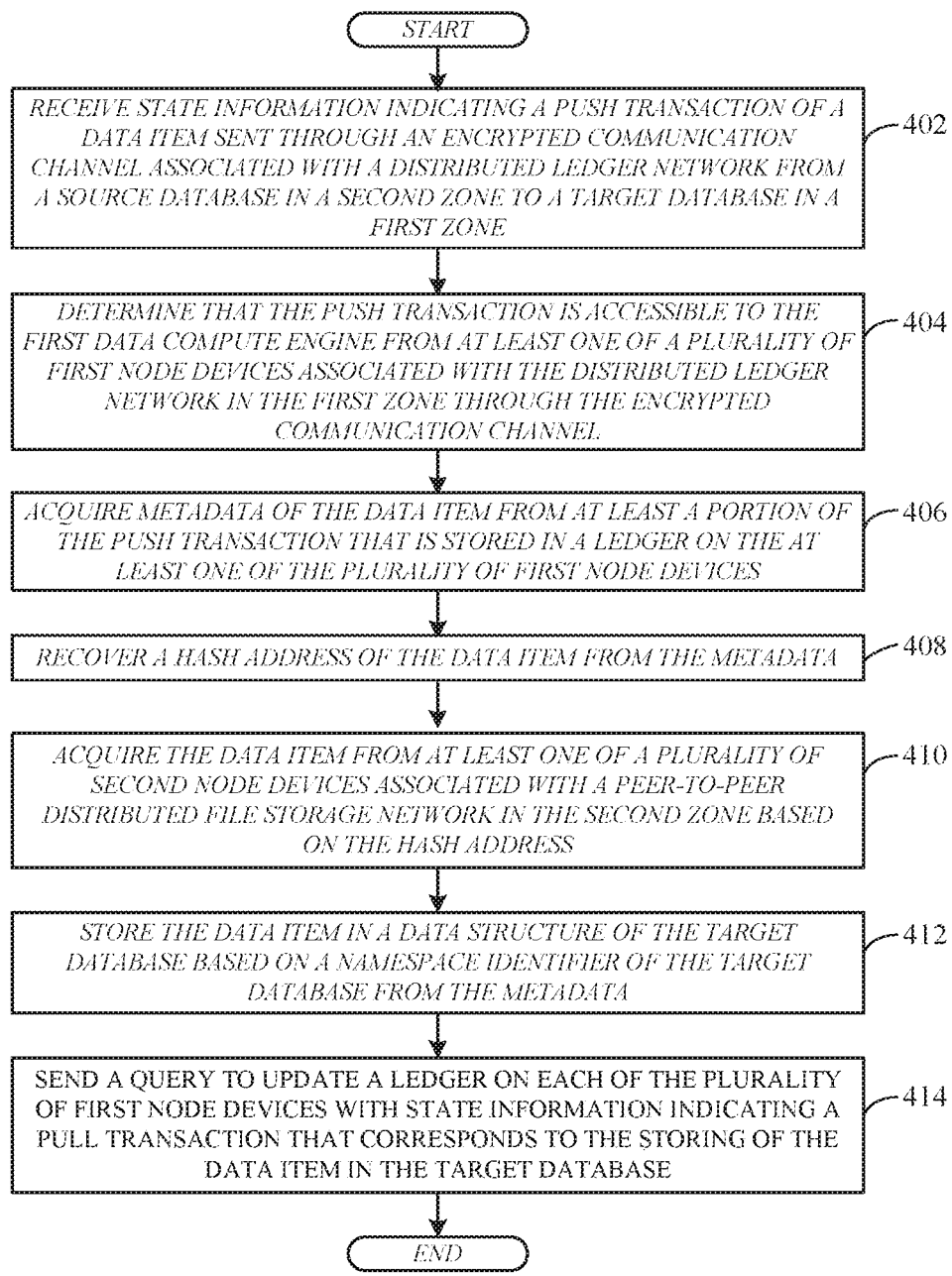
FIG. 4 illustrates a flowchart of a pull transaction for transferring data between different zones, according to an implementation.

FIG. 4 illustrates a flowchart of a pull transaction for transferring data between different zones, according to an implementation. One or more of the steps 402-408 of process 400 may be implemented, at least in part, in the form of executable code stored on non-transitory, tangible, machine-readable media that when run by one or more processors may cause the one or more processors to perform one or more of the steps 402-408. Some examples of computing devices, such as computing system 500 may include non-transitory, tangible, machine readable media that include executable code that when run by one or more processors (e.g., processor 512) may cause the one or more processors to perform the steps of process 400. As illustrated, the process 400 includes a number of enumerated steps, but aspects of the process 400 may include additional steps before, after, and in between the enumerated steps. In some aspects, one or more of the enumerated steps may be omitted or performed in a different order.

The process 400 starts at step 402, where a first data compute engine in a first zone can receive state information indicating a first type of transaction of a data item sent through an encrypted communication channel associated with a distributed ledger network from a source database in a second zone different from the first zone to a target database in the first zone.

Next, at step 404, a distributed ledger client of the first data compute engine can determine that the first type of transaction is accessible to the system from at least one of a plurality of first node devices associated with the distributed ledger network in the first zone through the encrypted communication channel.

Subsequently, at step 406, the distributed ledger client of the first data compute engine can acquire metadata of the data item from at least a portion of the first type of transaction that is stored in a ledger on the at least one of the plurality of first node devices.

Next, at step 408, the distributed ledger client of the first data compute engine can recover a hash address of the data item from the metadata.

Subsequently, at step 410, a distributed storage client of the first data compute engine can acquire the data item from at least one of a plurality of second node devices associated with a distributed file storage network in the second zone based on the hash address.

Next, at step 412, a database client of the first data compute engine can store the data item in a data structure of the target database based on a namespace identifier of the target database from the metadata.

Subsequently, at step 414, the distributed ledger client of the first data compute engine can send a query to update a ledger on each of the plurality of first node devices with state information indicating a second type of transaction that corresponds to a retrieval of the data item from the distributed file storage network and the storing of the data item in the target database, in which the target database is synchronized with the source database based on the first type of transaction and the second type of transaction of the data item.

Figure 5:
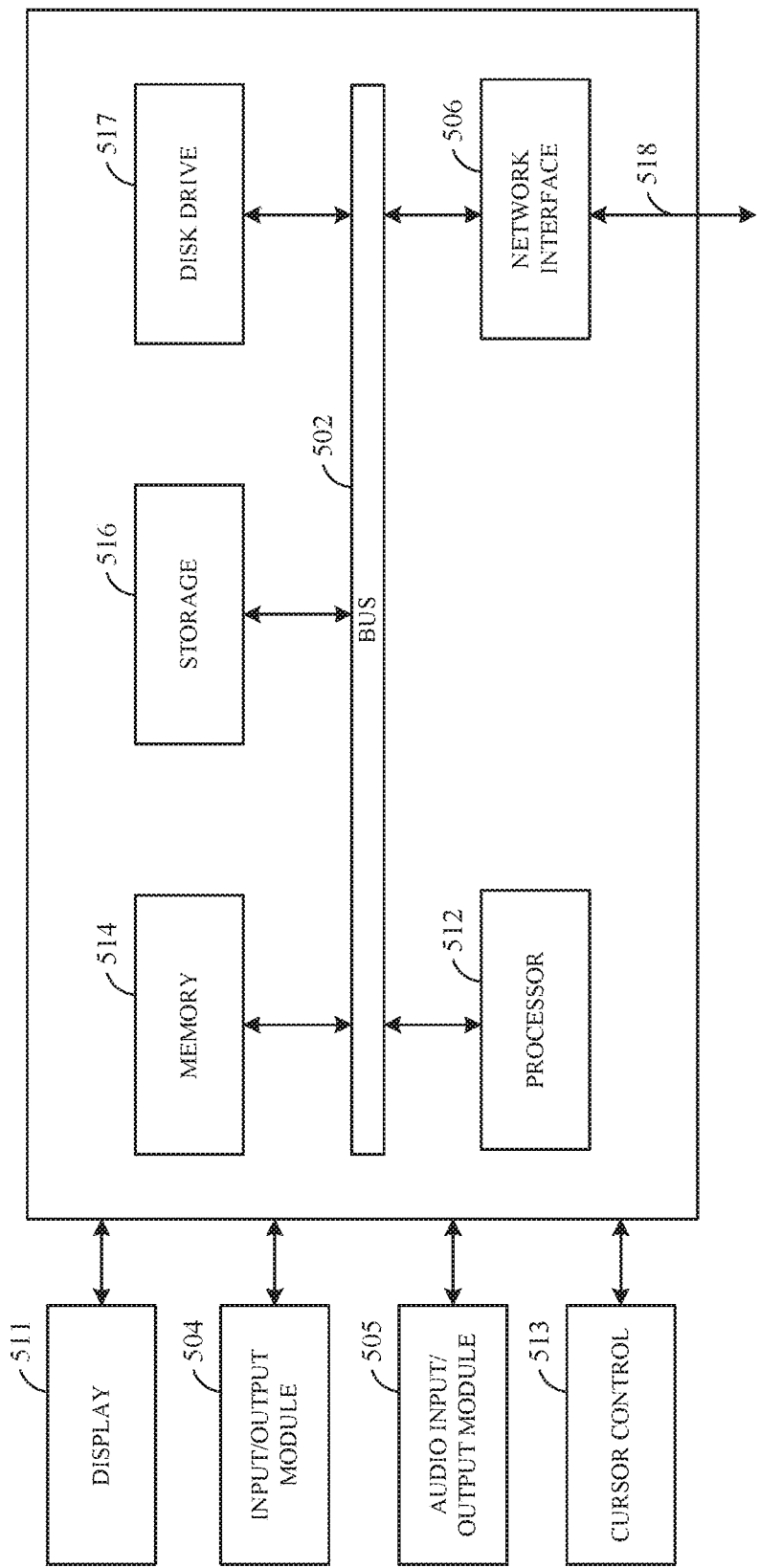
FIG. 5 illustrates a block diagram of a computer system suitable for implementing one or more components in FIG. 1, according to an implementation.

FIG. 5 is a block diagram of a computer system 500 suitable for implementing one or more components in FIG. 1, according to an implementation. In various implementations, a computing device may include a personal computing device e.g., smart phone, a computing tablet, a personal computer, laptop, a wearable computing device such as glasses or a watch, Bluetooth device, key FOB, badge, etc.) capable of communicating with the network. The service provider server 110 may utilize a network computing device (e.g., a network server) capable of communicating with the network 180. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 180. In one implementation, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that include bus 502. In one implementation, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 500. In various other implementations of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art will recognize that changes may be made in form and detail without departing from the scope of the present disclosure. Thus, the present disclosure is limited only by the claims.

What is claimed is:

1. A method relating to securing a data transfer between databases, the method comprising:

accessing, at a first computing device comprising a first data compute engine, information indicating a request has been made to transfer a data item from a source database in a first zone to a target database in a second zone different from the first zone through an encrypted communication channel associated with a distributed ledger network, wherein the first zone comprises a first plurality of computing devices including the first computing device, and wherein the second zone comprises a second plurality of computing devices;

receiving, by the first computing device, the data item from the source database through a networked connection to the source database;

generating, by the first computing device using a hashing algorithm, a hash value based on content of the data item;

causing storage, by the first computing device, of the data item in at least one of the first plurality of computing devices, wherein the first plurality of computing devices are associated with a distributed file storage network corresponding to the distributed ledger network;

causing storage, by the first computing device, of the hash value and additional information associated with the data item into a ledger on at least one of the second plurality of computing devices, wherein the second plurality of computing devices are associated with the distributed ledger network; and sending, by the first computing device, a request to update a ledger on each of the second plurality of computing devices with state information indicating a first type of transaction that corresponds to storing of the data item in the distributed file storage network, wherein the request is configured to synchronize the target database with the source database based on the first type of transaction and a second type of transaction.

2. The method of claim 1, wherein receiving the data item from the source database is performed via a database client of the first computing device.

3. The method of claim 1, wherein generating the hash value from content of the data item through the hash algorithm is performed via a distributed storage client of the first data compute engine.

4. The method of claim 1, wherein the first type of transaction comprises a push transaction and the second type of transaction comprises a pull transaction.

5. The method of claim 1, further comprising:
receiving, using a web application module with an interface to a user device, a configuration file comprising metadata, wherein the metadata comprises one or more of a database identifier identifying the target database, a table identifier identifying a location within a data structure of the target database, a unique identifier indicating an epoch column that provides a synchronization point to the source database, or a channel identifier indicating the encrypted communication channel between the source database and the target database; and storing the configuration file in a configuration table of a data repository communicably coupled to the web application module.

6. The method of claim 1, wherein the state information, after being received at a second computing device in the second plurality of computing devices, causes the second computing device to acquire the data item from at least one of the first plurality of computing devices associated with the distributed file storage network.

7. The method of claim 1, wherein the additional information comprises configuration information including one or more of a database identifier identifying the target database, a table identifier identifying a location within a data structure of the target database, a unique identifier indicating an epoch column that provides a synchronization point to the source database, or a channel identifier indicating the encrypted communication channel between the source database and the target database.

8. A first computing device, comprising:
a processor; and
a non-transitory computer-readable storage medium having stored thereon instructions that are executable by the first computing device to cause the first computing device to perform operations comprising:
accessing, at the first computing device, information indicating a request has been made to transfer a data item from a source database in a first zone to a target database in a second zone different from the first zone through an encrypted communication channel associated with a distributed ledger network, wherein the first zone comprises a first plurality of computing devices including the first computing device, and wherein the second zone comprises a second plurality of computing devices;

receiving, by the first computing device, the data item from the source database through a networked connection to the source database;
generating, by the first computing device using a hashing algorithm, a hash value based on content of the data item;
causing storage, by the first computing device, of the data item in at least one of the first plurality of computing devices, wherein the first plurality of computing devices are associated with a distributed file storage network corresponding to the distributed ledger network;
causing storage, by the first computing device, of the hash value and additional information associated with the data item into a ledger on at least one of the second plurality of computing devices, wherein the second plurality of computing devices are associated with the distributed ledger network; and
sending, by the first computing device, a request to update a ledger on each of the second plurality of computing devices with state information indicating a first type of transaction that corresponds to storing of the data item in the distributed file storage network, wherein the request is configured to synchronize the target database with the source database based on the first type of transaction and a second type of transaction.

9. The first computing device of claim 8, wherein receiving the data item from the source database is performed via a database client of the first computing device.

10. The first computing device of claim 8, wherein generating the hash value from content of the data item through the hash algorithm is performed via a distributed storage client of the first data compute engine.

11. The first computing device of claim 8, wherein the first type of transaction comprises a push transaction and the second type of transaction comprises a pull transaction.

12. The first computing device of claim 8, wherein the state information, after being received at a second computing device in the second plurality of computing devices, causes the second computing device to acquire the data item from at least one of the first plurality of computing devices associated with the distributed file storage network.

13. The first computing device of claim 8, wherein the additional information comprises configuration information including one or more of a database identifier identifying the target database, a table identifier identifying a location within a data structure of the target database, a unique identifier indicating an epoch column that provides a synchronization point to the source database, or a channel identifier indicating the encrypted communication channel between the source database and the target database.

14. The first computing device of claim 8, wherein the operations further comprise:
receiving, using a web application module with an interface to a user device, a configuration file comprising metadata, wherein the metadata comprises one or more of a database identifier identifying the target database, a table identifier identifying a location within a data structure of the target database, a unique identifier indicating an epoch column that provides a synchronization point to the source database, or a channel identifier indicating the encrypted communication channel between the source database and the target database; and storing the configuration file in a configuration table of a data repository communicably coupled to the web application module.

15. A non-transitory computer-readable storage medium having stored thereon instructions that are executable by a first computing device to cause the first computing device to perform operations comprising:

accessing, at the first computing device, information indicating a request has been made to transfer a data item from a source database in a first zone to a target database in a second zone different from the first zone through an encrypted communication channel associated with a distributed ledger network, wherein the first zone comprises a first plurality of computing devices including the first computing device, and wherein the second zone comprises a second plurality of computing devices;

receiving, by the first computing device, the data item from the source database through a networked connection to the source database;

generating, by the first computing device using a hashing algorithm, a hash value based on content of the data item;

causing storage, by the first computing device, of the data item in at least one of the first plurality of computing devices, wherein the first plurality of computing devices are associated with a distributed file storage network corresponding to the distributed ledger network;

causing storage, by the first computing device, of the hash value and additional information associated with the data item into a ledger on at least one of the second plurality of computing devices, wherein the second plurality of computing devices are associated with the distributed ledger network; and sending, by the first computing device, a request to update a ledger on each of the second plurality of computing devices with state information indicating a first type of transaction that corresponds to storing of the data item in the distributed file storage network, wherein the request is configured to synchronize the target database with the source database based on the first type of transaction and a second type of transaction.

16. The non-transitory computer-readable storage medium of claim 15, wherein receiving the data item from the source database is performed via a database client of the first computing device.

17. The non-transitory computer-readable storage medium of claim 15, wherein generating the hash value from content of the data item through the hash algorithm is performed via a distributed storage client of the first data compute engine.

18. The non-transitory computer-readable storage medium of claim 15, wherein the first type of transaction comprises a push transaction and the second type of transaction comprises a pull transaction.

19. The non-transitory computer-readable storage medium of claim 15, wherein the state information, after being received at a second computing device in the second plurality of computing devices, causes the second computing device to acquire the data item from at least one of the first plurality of computing devices associated with the distributed file storage network.

20. The non-transitory computer-readable storage medium of claim 15, wherein the additional information comprises configuration information including one or more of a database identifier identifying the target database, a table identifier identifying a location within a data structure of the target database, a unique identifier indicating an epoch column that provides a synchronization point to the source database, or a channel identifier indicating the encrypted communication channel between the source database and the target database.

* * * * *